US011757530B2

(12) United States Patent
Bottari et al.

(10) Patent No.: US 11,757,530 B2
(45) Date of Patent: Sep. 12, 2023

(54) METHOD AND APPARATUS FOR OPTICAL WIRELESS COMMUNICATION (71) Applicant: Telefonaktiebolaget LM Ericsson (publ), Stockholm (SE)

(72) Inventors: Guilio Bottari, Pisa (IT); Antonio D'errico, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 401 days.

(21) Appl. No.: 16/326,766

(22) PCT Filed: Aug. 30, 2016

(86) PCT No.: PCT/EP2016/070416
§ 371 (c)(1),
(2) Date: Feb. 20, 2019

(87) PCT Pub. No.: WO2018/041341
PCT Pub. Date: Mar. 8, 2018

(65) Prior Publication Data
US 2019/0238227 A1 Aug. 1, 2019

(51) Int. Cl.
*H04B 10/114* (2013.01)
*H04B 10/116* (2013.01)
(Continued)

(52) U.S. Cl.
CPC ....... *H04B 10/1149* (2013.01); *H04B 10/116* (2013.01); *H04B 10/1141* (2013.01);
(Continued)

(58) Field of Classification Search
CPC .......................................... H04B 10/114–116
See application file for complete search history.

(56) References Cited

U.S. PATENT DOCUMENTS 6,763,195 B1 * 7/2004 Willebrand ........ H04B 10/1123
398/115
2012/0155889 A1 * 6/2012 Kim ..................... H04B 10/116
398/193

(Continued)

FOREIGN PATENT DOCUMENTS

JP 2005318493 A 11/2005
WO 2007025038 A1 3/2007

OTHER PUBLICATIONS

Hu, Wei, et al., "Graphene-based liquid crystal microlens arrays", MIPPR 2015: Multispectral Image Acquisition, Processing, and Analysis, Proc. of SPIE vol. 9811, Dec. 17, 2015, pp. 1-6.
(Continued)

*Primary Examiner* — Nathan M Cors
(74) *Attorney, Agent, or Firm* — Murphy, Bilak & Homiller, PLLC (57) ABSTRACT

A method (100) for managing Optical Wireless Communication (OWC) in a User Equipment (UE) is disclosed, the UE being configured for Radio Frequency (RF) communication with a network and comprising at least two OWC receivers. The method comprises monitoring a captured luminous flux intensity at the OWC receivers (1 10) and, if a captured luminous flux intensity at at least one of the OWC receivers is above a viability threshold (120), selecting the OWC receiver having the highest captured luminous flux intensity (130) and extracting client data from an optical signal received on the selected OWC receiver (140). Also disclosed are a UE (300, 700) configured for RF communication with a network and for OWC, the UE comprising at least two OWC receivers, and a controller (500, 600) for managing OWC in a UE.

21 Claims, 6 Drawing Sheets (51) Int. Cl.
  H04B 10/60 (2013.01)
  H04W 24/08 (2009.01)
  H04W 88/02 (2009.01)
(52) U.S. Cl.
  CPC ............ H04B 10/60 (2013.01); H04W 24/08 (2013.01); H04W 88/02 (2013.01)

(56) References Cited

U.S. PATENT DOCUMENTS

| | | | |
|---|---|---|---|
| 2012/0170947 A1* | 7/2012 | Kim | H04B 10/116 398/202 |
| 2014/0226977 A1 | 8/2014 | Jovicic et al. | |
| 2015/0237268 A1 | 8/2015 | Vaiaoga et al. | |
| 2017/0346559 A1* | 11/2017 | Eroglu | H04B 10/116 |

OTHER PUBLICATIONS

Pathak, Parth H., et al., "Visible Light Communication, Networking and Sensing: A Survey, Potential and Challenges", DOI 10.1109/COMST.2015.2476474, IEEE Communications Surveys & Tutorials, 2015, pp. 1-35.

Ren, Hongwen, et al., "Polymer-based flexible microlens arrays with hermaphroditic focusing properties", Applied Optics; vol. 44, No. 36, Dec. 20, 2005, pp. 7730-7734.

Tsonev, Dobroslav, et al., "Light Fidelity (Li-Fi): Towards All-Optical Networking", http://www.homepages.ed.ac.uk/hxh/Li-Fi_PAPERS/14_optical_attocells.pdf, Feb. 1, 2014, pp. 1-10.

* cited by examiner

METHOD AND APPARATUS FOR OPTICAL WIRELESS COMMUNICATION

TECHNICAL FIELD

The present disclosure relates to a method for managing Optical Wireless Communication (OWC) in a User Equipment (UE) configured for Radio Frequency (RF) communication with a network. The present disclosure also relates to a controller for managing OWC in a User Equipment, and to a User Equipment.

BACKGROUND

Over the past decade, significant research efforts have been directed towards exploring alternative parts of the electromagnetic spectrum to the overcrowded Radio Frequency (RF) domain. Such alternative parts of the spectrum could be used to offload a portion of communication network traffic from the RF domain, at least in certain specific situations. A promising potential alternative to RF communication is Optical Wireless Communication (OWC) which refers to unguided optical communication. OWC uses visible or non-visible, including infrared and ultraviolet, light to carry data signals. OWC technologies operating in the visible part of the spectrum are referred to as Visible Light Communication (VLC).

Figure 1:
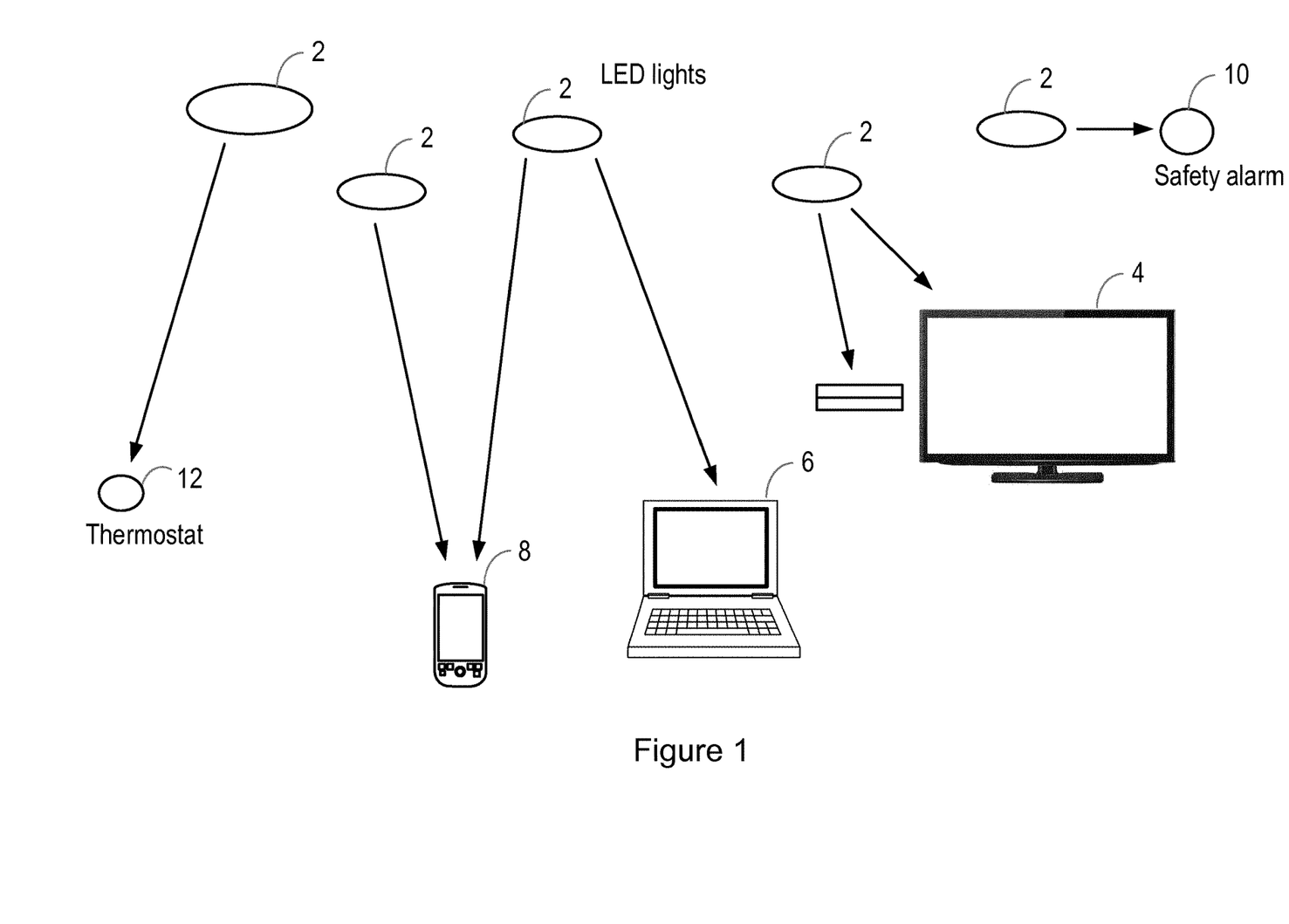
FIG. 1 is a representation of a Li-Fi deployment scenario.

Light Fidelity (Li-Fi) is a particular type of OWC characterised by the use of light from Light-Emitting Diodes (LEDs) or Laser Diodes (LD) as a medium to deliver networked, mobile, high-speed communication in a similar manner to Wi-Fi. Li-Fi is principally envisaged as operating within the visible light spectrum, and may thus be considered as a form of VLC. However, some experiments have proposed forms of Li-Fi based on Infrared light, and Li-Fi may therefore encompass OWC technologies outside the visible spectrum. Potential deployment scenarios for Li-Fi include operation as a complement to Wi-Fi or cellular communications and as a replacement to these technologies in certain specific situations. FIG. 1 illustrates a possible Li-Fi deployment scenario, with a room served by indoor Li-Fi coverage provided by ceiling mounted light sources 2. A smart television and set top box 4, laptop computer 6, smartphone 8, alarm 10 and smart thermostat 12 may all receive network data via optical signals delivered by the light sources 2.

An important advantage offered by Li-Fi is data density. Light is easier to contain within a confined area than RF signals, and can therefore provide a higher data density without interference than RF communication. In currently envisaged practical deployments, Li-Fi also offers energy savings compared to RF communication, as it may be integrated with existing lighting systems, so reducing dedicated power requirements for signal transmission. Li-Fi also offers a high level of security, owing to the fact than light signals cannot pass through walls. Data transfer within a confined space may therefore be secured from outside hacking and interference.

In addition to providing security advantages, the obstruction of light signals by walls and other solid obstacles also generates challenges for the commercialisation of Li-Fi. LED or LD positioning and density must be carefully managed to ensure sufficient coverage, taking into account the impact of walls and other obstacles and the reduced propagation range of Li-Fi signals compared to RF signals. Avoiding dead spots in areas that do not have line of sight to transmitters is a significant challenge. This challenge is complicated by the fact that, unlike RF internal antennas in mobile phones and other communication network terminals, receivers for Li-Fi signals can be blinded by obstacles near the terminal, including the hand of a terminal user.

SUMMARY

It is an aim of the present disclosure to provide a method and apparatus which obviate or reduce at least one or more of the challenges mentioned above.

According to a first aspect of the present disclosure, there is provided a method for managing Optical Wireless Communication (OWC) in a User Equipment (UE) configured for Radio Frequency (RF) communication with a network, the UE comprising at least two OWC receivers. The method comprises monitoring a captured luminous flux intensity at the OWC receivers and, if a captured luminous flux intensity at at least one of the OWC receivers is above a viability threshold, selecting the OWC receiver having the highest captured luminous flux intensity and extracting client data from an optical signal received on the selected OWC receiver.

In some examples of the present disclosure, the OWC receivers may comprise Visible Light Communication (VLC) receivers and may comprise Li-Fi receivers. The OWC receivers may in some examples comprise photodetectors (PDs) such as photodiodes or image sensors.

In some examples of the present disclosure, the optical signal may be converted to an electrical signal before client data is extracted from the optical signal.

In some examples of the present disclosure, the method may further comprise, if a captured luminous flux intensity at none of the OWC receivers is above a viability threshold, extracting the client data from a Radio Frequency signal. Examples of the present disclosure may thus comprise reverting to, or continuing with, RF data acquisition in the event that no OWC receiver is capturing a viable optical signal. Examples of the present disclosure may thus ensure automatic transition between OWC and RF communication on the basis of availability of a viable OWC signal.

In some examples of the present disclosure, the method may further comprise selecting at least one other OWC receiver having a captured luminous flux intensity above the viability threshold, and simultaneously extracting the client data from optical signals received on the selected OWC receivers.

In some examples of the present disclosure, the method may further comprise, if the captured luminous flux intensity at the selected OWC receiver descends below a selection threshold, ceasing to extract the client data from the optical signal received on the selected OWC receiver, selecting a new OWC receiver having the highest captured luminous flux intensity, and extracting the client data from an optical signal received on the new selected OWC receiver.

In some examples of the present disclosure, the selection threshold may be greater than the viability threshold.

In some examples of the present disclosure, the method may further comprise, while the captured luminous flux intensity at the selected OWC receiver remains above the selection threshold, continuing to extract the client data from the optical signal received on the selected OWC receiver.

In some examples of the present disclosure, the method may further comprise checking at discrete intervals whether or not the captured luminous flux intensity at the selected OWC receiver has descended below the selection threshold. In some examples, the method may comprise checking at 1 ms intervals. Smaller or larger intervals may be used according to available processing power for operation of the method.

In some examples of the present disclosure, the method may further comprise populating an OWC receiver list with OWC receivers having a captured luminous flux intensity above the viability threshold and ordering the OWC receiver list according to captured luminous flux intensity. Selecting the OWC receiver having the highest captured luminous flux intensity may in such examples comprise selecting the first OWC receiver in the list.

In some examples of the present disclosure, the method may further comprise updating the populated OWC receiver list on at least one of a continuous or discrete basis.

In some examples of the present disclosure, monitoring a captured luminous flux intensity at the OWC receivers may comprise monitoring an average received power at the OWC receivers.

In some examples of the present disclosure, at least one of the OWC receivers may be operable to capture luminous flux incident from a first side of the UE, and at least one of the OWC receivers may be operable to capture luminous flux incident from a second side of the UE, the second side being opposed to the first side.

In some examples of the present disclosure, at least one of the OWC receivers may be located on the first side of the UE and at least one of the OWC receivers may be located on the second side of the UE.

In some examples of the present disclosure, at least one of the OWC receivers may be located on a corner of the UE. In some examples of the present disclosure, the at least one OWC receiver located on a corner of the UE may comprise a quarter spherical lens array.

According to another aspect of the present disclosure, there is provided a computer program comprising instructions which, when executed on at least one processor, cause the at least one processor to carry out a method according to the preceding aspect of the present invention.

According to another aspect of the present disclosure, there is provided a carrier containing a computer program according to the preceding aspect of the disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the disclosure.

According to another aspect of the present disclosure, there is provided a controller for managing Optical Wireless Communication (OWC) in a User Equipment (UE) configured for Radio Frequency (RF) communication with a network, the UE comprising at least two OWC receivers. The controller comprises a processor and a memory, the memory containing instructions executable by the processor such that the controller is operable to monitor a captured luminous flux intensity at the OWC receivers and, if a captured luminous flux intensity at at least one of the OWC receivers is above a viability threshold, select the OWC receiver having the highest captured luminous flux intensity and extract client data from an optical signal received on the selected OWC receiver.

In some examples of the present disclosure, the controller may be further operable to perform a method according to a preceding aspect of the present disclosure.

According to another aspect of the present disclosure, there is provided a controller for managing Optical Wireless Communication (OWC) in a User Equipment (UE) configured for Radio Frequency (RF) communication with a network, the UE comprising at least two OWC receivers. The controller is configured to monitor a captured luminous flux intensity at the OWC receivers and, if a captured luminous flux intensity at at least one of the OWC receivers is above a viability threshold, select the OWC receiver having the highest captured luminous flux intensity and extract client data from an optical signal received on the selected OWC receiver.

According to another aspect of the present disclosure, there is provided a controller for managing Optical Wireless Communication (OWC) in a User Equipment (UE) configured for Radio Frequency (RF) communication with a network, the UE comprising at least two OWC receivers. The controller comprises a monitoring module for monitoring a captured luminous flux intensity at the OWC receivers, and a selection module for, if a captured luminous flux intensity at at least one of the OWC receivers is above a viability threshold selecting the OWC receiver having the highest captured luminous flux intensity and extracting client data from an optical signal received on the selected OWC receiver.

According to another aspect of the present disclosure, there is provided a User Equipment (UE), configured for Radio Frequency (RF) communication with a network, wherein the UE is further configured for Optical Wireless Communication (OWC). The UE comprises at least two OWC receivers.

In some examples of the present disclosure, the OWC receivers may comprise Visible Light Communication (VLC) receivers and may comprise Li-Fi receivers. The OWC receivers may in some examples comprise photodetectors (PDs) such as photodiodes or image sensors.

In some examples of the present disclosure, at least one of the OWC receivers may be operable to capture luminous flux incident from a first side of the UE and at least one of the OWC receivers may be operable to capture luminous flux incident from a second side of the UE, the second side being opposed to the first side.

In some examples of the present disclosure, at least one of the OWC receivers may be located on the first side of the UE and at least one of the OWC receivers may be located on the second side of the UE.

In some examples of the present disclosure, at least one of the OWC receivers may be located on a corner of the UE. In some examples of the present disclosure, the at least one OWC receiver located on a corner of the UE may comprise a quarter spherical lens array.

In some examples of the present disclosure, the at least one OWC receiver located on a corner of the UE may be constructed from at least one of graphene based liquid crystal or a polymer based lens array.

In some examples of the present disclosure, the UE may further comprise a controller according to any one of the preceding aspects of the present disclosure.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Aspects of the present disclosure provide a User Equipment (UE) configured both for Radio Frequency (RF) communication and for Optical Wireless Communication (OWC). The present disclosure also provides a method for managing OWC in a UE configured for RF communication with a network. Aspects of the present invention may thus contribute to enabling the use of OWC technologies, such as Li-Fi, as a complement to cellular and Wi-Fi RF communication. Aspects of the present invention enable a UE to take advantage of being able to offload data acquisition onto an optical signal such as Li-Fi when a viable optical signal is available, thus enabling the UE to free up RF capacity according to optical network availability in its current environment.

Figure 2:
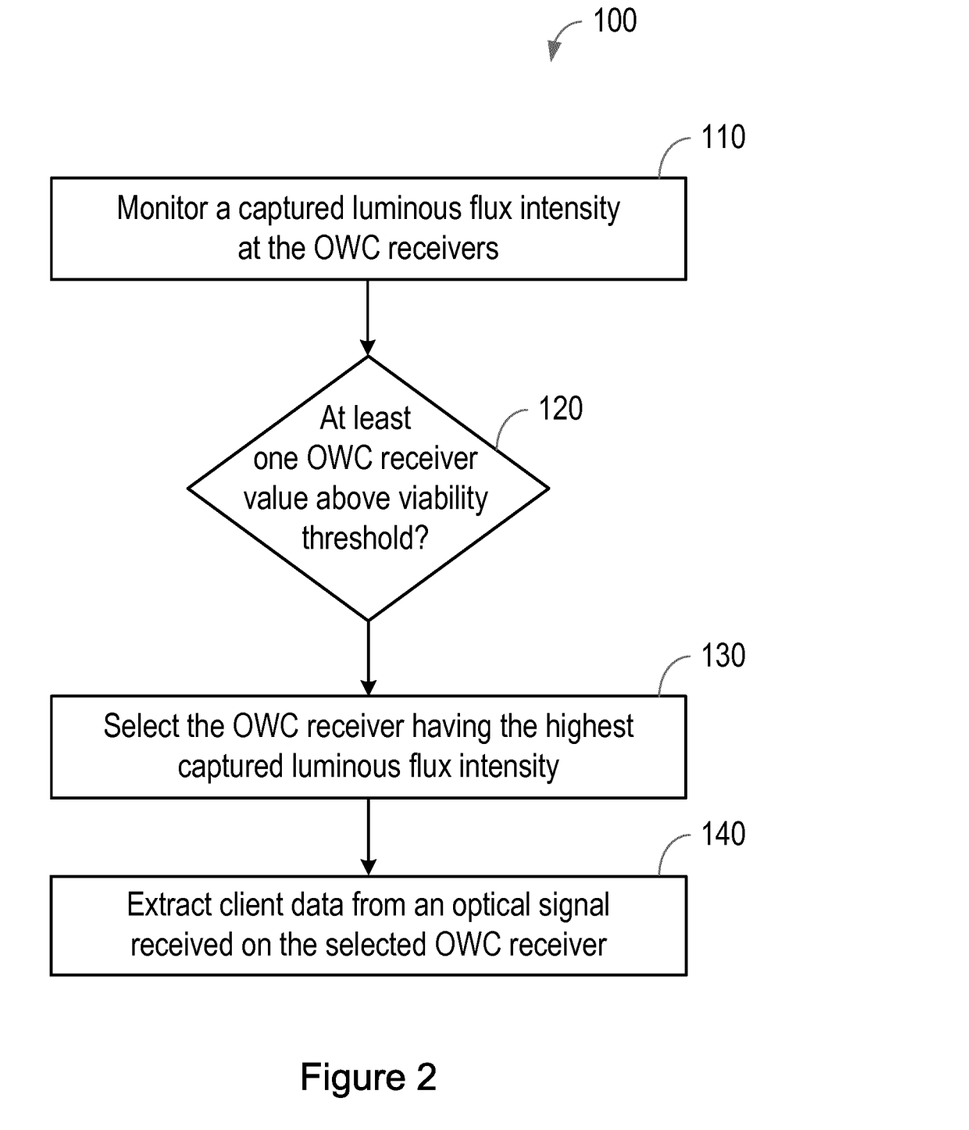
FIG. 2 is a flow chart illustrating process steps in a method for managing Optical Wireless Communication in a User Equipment.

FIG. 2 is a flow chart illustrating process steps in a method 100 for managing OWC in a UE configured for RF communication with a network. The UE comprises at least two OWC receivers, which may for example be photodiodes or image sensors.

Referring to FIG. 2, the method 100 comprises, in a first step 110, monitoring a captured luminous flux intensity at the OWC receivers. In step 120, the method comprises determining whether or not a captured luminous flux intensity at at least one of the OWC receivers is above a viability threshold. If a captured luminous flux intensity at at least one of the OWC receivers is above a viability threshold, the method comprises, in step 130, selecting the OWC receiver having the highest captured luminous flux intensity, and, in step 140, extracting client data from an optical signal received on the selected OWC receiver. The method 100 of FIG. 1 thus facilitates the implementation of OWC in a UE by selecting an OWC receiver that is receiving a viable optical signal and extracting client data from an optical signal received on the selected OWC receiver. In the event that an OWC receiver on the UE is at least partially obstructed, for example by a user hand or face, or as a consequence of the orientation of the UE, and is thus unable to receive a viable OWC signal, another OWC receiver may be selected for the extraction of client data. In this manner it may be ensured that if a viable optical signal is being received on any OWC receiver on the UE, client data may be extracted and OWC may thus be enabled for the UE. The OWC receivers on the UE may be Li-Fi receivers, and the optical signal received on the OWC receivers may be a Li-Fi signal, which may be a visible light signal or may be an ultra violet or infrared signal.

FIGS. 3a and 3b illustrate an example of a UE 300 according to one aspect of the present invention. The UE is configured for RF communication with a network, and therefore comprises appropriate antennas and transmitters for exchanging RF signals with a network base station. Referring to FIGS. 3a and 3b, the UE also comprises at least two OWC receivers 310, 320. The OWC receivers may comprise photodiodes and/or image sensors. Photodiodes have been widely adopted in optical communication systems with relatively large received optical power, and offer advantages including relatively low cost and possible high reception bandwidth. Image sensors in contrast may provide receiver spatial diversity, so enhancing detection performance and enabling additional source location information for location-aware services. OWC receivers most appropriate for a particular example of UE may be selected according to the planned application scenario for OWC for the UE. For example, for application scenarios in which it is envisaged that multiple LED arrays in a room may send different signals to multiple different UEs, using a large field-of-view (FOV) photodiode may lead to large interference that degrades the received optical Signal-to-Noise Ratio (SNR). In such cases image sensors may provide improved performance, being able effectively to discriminate between different LED arrays and reduce inter-array interference.

Figure 3:
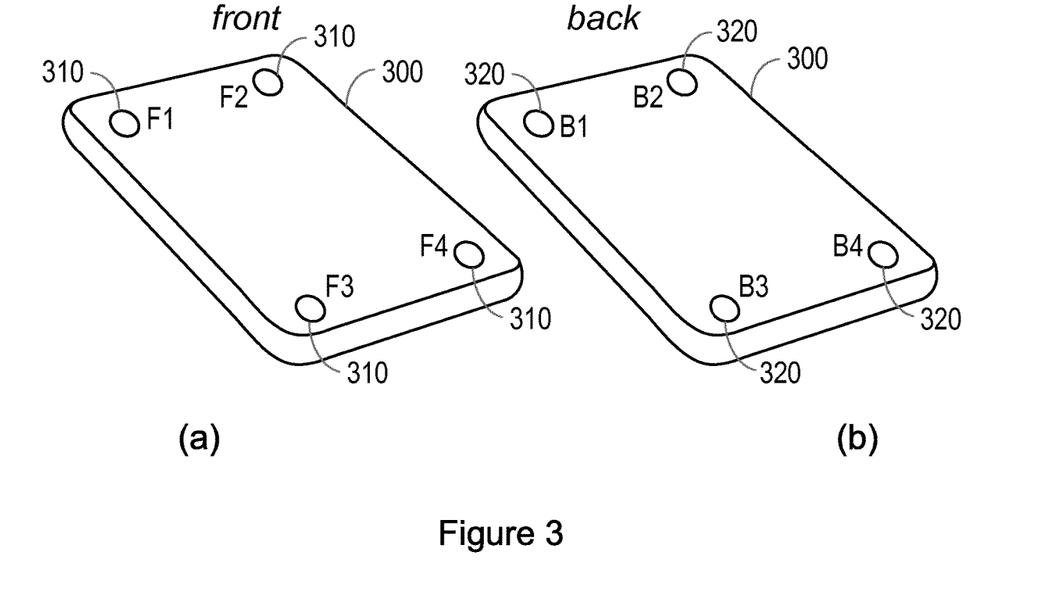
FIGS. 3a and 3b illustrate a User Equipment.

In the example UE illustrated in FIGS. 3a and 3b, the UE 300 comprises a first plurality of OWC receivers 310, operable to capture luminous flux incident from a first side of the UE, and a second plurality of OWC receivers 320 operable to capture luminous flux incident from a second side of the UE, the second side being opposed to the first side. In the illustrated example, the first and second pluralities of OWC receivers 310, 320 are located on the first and second sides of the UE, illustrated as the front and back of the UE. As shown in FIG. 3, the OWC receivers may be positioned near the corners of the front and back of the UE. Other arrangements of OWC receivers may be envisaged, including different numbers of OWC receivers and different positioning of the OWC receivers.

Figure 4:
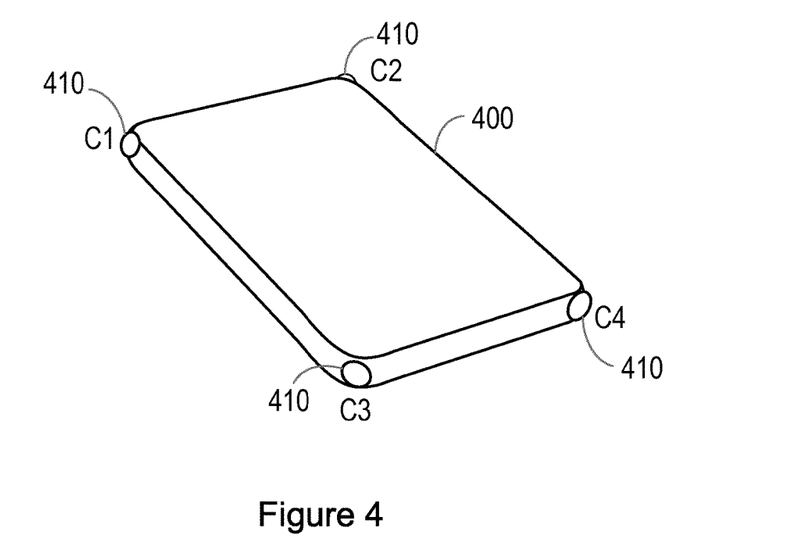
FIG. 4 illustrates another example of User Equipment.

FIG. 4 illustrates another example of UE 400, the UE 400 comprising a plurality of OWC receivers 410, each of the OWC receivers being operable to capture luminous flux incident from both the first and the second side of the UE. The OWC receivers 410 are located on corners of the UE. The OWC receivers 410 may for example comprise quarter spherical lens arrays and may be constructed from at least one of graphene based liquid crystal or a polymer based lens array. The quarter spherical shape of the lens arrays, and their location on the corners of the UE 400, may enable the OWC receivers 410 to capture luminous flux incident from the first and second sides of the UE simultaneously. Additionally, the corners of a UE are rarely covered by a user's hands in normal operation of a UE, and thus OWC receivers placed on UE corners are likely to be unobscured a large proportion of the time. Placing OWC receivers on the corners of the UE also avoids having to place any additional hardware over or within the UE screen, which in some examples may compromise the optimisation of user experience for the viewing of media on the UE.

Figure 5A:
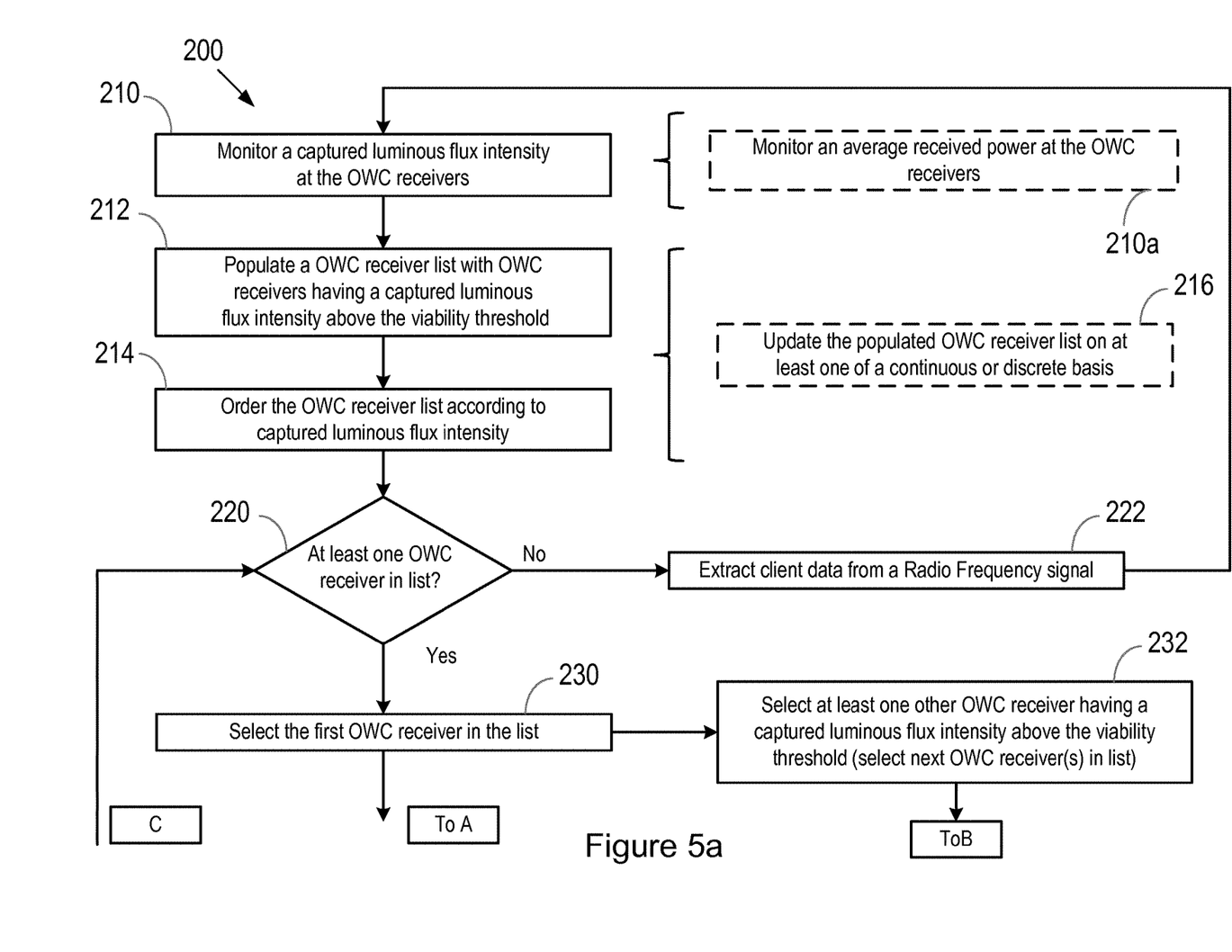
FIGS. 5a and 5b show a flow chart illustrating process steps in another example of method for managing Optical Wireless Communication in a User Equipment.
Figure 5B:
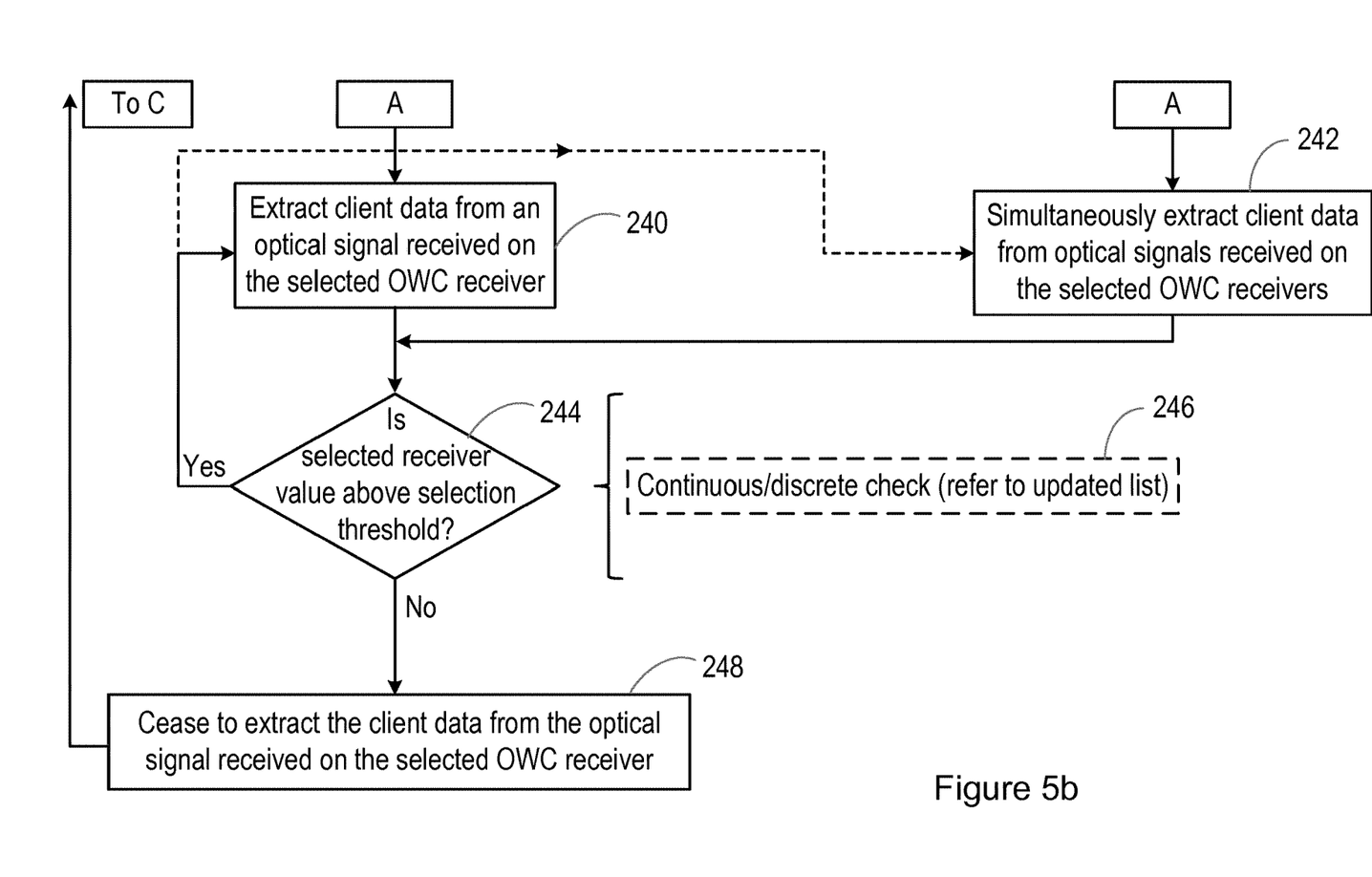

FIGS. 5a and 5b illustrate a flow chart showing process steps in another method 200 for managing OWC in a UE configured for RF communication with a network. The method 200 illustrates one way in which the steps of the method 100 may be implemented and supplemented so as to provide the above discussed and additional functionality. The UE managed by the method 200 of FIGS. 5a and 5b comprises at least two OWC receivers, which may for example be photodiodes or image sensors. In some examples of the present disclosure, the UE managed by the method 200 may comprise a UE 300 as illustrated in FIG. 3 or a UE 400 as illustrated in FIG. 4. The method 200 may be implemented in a controller which may be comprised within the UE.

Referring to FIGS. 5a and 5b, in a first step 210, the method 200 comprises monitoring a captured luminous flux intensity at the OWC receivers of the UE. As illustrated in step 210a, average received power at the OWC receivers may be monitored as a parameter to quantify the captured luminous flux intensity at the OWC receivers. In step 212, the method 200 comprises populating an OWC receiver list with OWC receivers having a captured luminous flux intensity above a viability threshold. The viability threshold may correspond to a captured luminous flux intensity, or representative average received power, at which client data may be reliably extracted from a received optical signal. An optical signal received with a captured luminous flux intensity below the viability threshold would not therefore be sufficient to enable reliable extraction of client data, and OWC receivers with a captured luminous flux intensity below this threshold are not populated into the OWC receiver list. In step 214, the method 200 comprises ordering the OWC receiver list according to captured luminous flux intensity, for example such that the OWC receiver having the highest captured luminous flux intensity is the first OWC receiver in the list.

As illustrated in step 216, the populated OWC receiver list may be updated on at least one of a continuous or discreet basis. With OWC receivers entering or leaving the list as captured luminous flux intensity at the receivers passes above or below the viability threshold. Additionally the order of the list may be changed to reflect varying captured luminous flux intensity at the receivers in the list.

In step 220, the method 200 comprises determining if the OWC receiver list includes at least one entry, and hence whether the captured luminous flux intensity at at least one of the OWC receivers is above the viability threshold. If the OWC receiver list does not contain any entries, then none of the OWC receivers is receiving a viable optical signal, and the method therefore comprises, at step 222, extracting client data from a RF signal received by the UE, and returning to step 210 to monitor the captured luminous flux intensity at the OWC receivers. In this manner, RF communication, which may be cellular or Wi-Fi may be enabled when no viable optical signal is being received. Implementing step 222 may comprise starting or restarting RF communication, or continuing with RF communication, if OWC is not currently in operation.

If the OWC receiver list contains at least one entry, then a viable optical signal is being received by at least one OWC receiver, and data acquisition by OWC may be initiated or continued. In step 230, the method 200 comprises selecting the first OWC receiver in the list and in step 240, the method comprises extracting client data from an optical signal received on the selected OWC receiver. In some examples, step 240 may comprise first converting the optical signal to an electrical signal before extracting the client data. In some examples, the method 200 may further comprise, In step 232, selecting at least one other OWC receiver having a captured luminous flux intensity above the viability threshold (i.e. at least one other OWC receiver from the list) and in step 242, simultaneously extracting client data from optical signals received on the selected OWC receivers. Step 232 may for example comprise selecting the next OWC receiver in the list, which, owing to the ordering of the list in step 212, will be the OWC having the second highest captured luminous flux intensity. Simultaneous detection from multiple OWC receivers may in come examples enable a reduction in bit error rate of received client data.

In step 244, the method 200 comprises determining if the captured luminous flux intensity at the selected OWC receiver is above a selection threshold. If the captured luminous flux intensity at the selected OWC receiver is above a selection threshold, the method returns to step 240 and/or 242 to continue to extract client data from the optical signal received on the selected OWC receiver(s). If the captured luminous flux intensity on the selected OWC receiver has descended below the selection threshold, the method 200 comprises, at step 248, ceasing to extract the client data from the optical signal received on the selected OWC receiver, and returning to step 220 to check whether the OWC receiver list still contains at least one entry and if so, select a new OWC receiver or revert to RF communication if the OWC receiver list does not contain any entries. The step 244 of checking if the captured luminous flux intensity at the selected OWC receiver is above a selection threshold may be performed on a continuous or discrete basis, and may make reference to the updated OWC list, updated on a continuous or discrete basis according to step 216.

In examples of the present disclosure, the selection threshold is greater than the viability threshold. It will be appreciated that a new OWC receiver is only selected when the captured luminous flux intensity at the selected OWC receiver descends below the selection threshold. The selected OWC receiver may therefore cease to be the first OWC receiver in the list and yet remain selected, with client data being extracted. Thus another OWC receiver may be receiving a higher intensity of luminous flux, but while the luminous flux intensity at the selected OWC receiver remains above the selection threshold, the method does not cease extracting client data form the selected OWC receiver and switch to a different OWC receiver. By basing reselection of OWC receivers on the selection threshold, rather than simply selecting a new receiver as soon as the currently selected one ceases to have the highest captured flux intensity, excessive or unstable switching between receivers may be avoided.

Table 1 below illustrates one example of how the method 200 described above may operate to manage OWC for the UE 300 illustrated in FIG. 3, using average received power as an indicator of captured luminous flux intensity and with a viability threshold of 100 µW and a selection threshold of 200 µW. Table 1 illustrates average received power at the eight OWC receivers of the UE 300 at three discrete time intervals $t_1$, $t_2$ and $t_3$.

TABLE 1

|    | $t_1$ | $t_2$ | $t_3$ |
|----|-----|-----|-----|
| F1 | 80  | 150 | 320 |
| F2 | 400 | 70  | 530 |
| F3 | 250 | 40  | 240 |
| F4 | 150 | 400 | 90  |
| B1 | 280 | 350 | 50  |
| B2 | 600 | 220 | 150 |
| B3 | 450 | 320 | 430 |
| B4 | 380 | 650 | 100 |

Referring to Table 1, at time $t_1$, seven of the eight OWC receivers on the UE 300 have an average received power over the viability threshold. Only OWC receiver F1 has an average received power below the viability threshold. The remaining seven OWC receivers may therefore be populated into the OWC receiver list and ordered according to average received power. OWC receiver B2 will be the first OWC receiver in the ordered list, having the highest average received power. OWC receiver B2 will therefore be selected and client data extracted. The populated OWC receiver list is updated on a substantially continuous basis with the changing average received powers at the different OWC receivers. At time $t_2$, the OWC receiver list contains six entries, as OWC receiver F1 now has an average received power above the viability threshold, and so has been populated into the list, however OWC receivers F2 and F3 now have average received powers below the viability threshold, and so are no longer in included in the OWC receiver list. It will be appreciated that OWC receiver B4 will now be the first OWC receiver in the list, as B4 has the highest average received power. However, selected OWC receiver B2 still has an average received power above the selection threshold of 200 µW, and thus remains the selected OWC receiver, with client data being extracted from its received optical signal. At time $t_3$, the OWC receiver list contains five entries, and the average received power at OWC receiver B2 has descended below the selection threshold of 200 µW. Data acquisition on B2 has therefore ceased and the current first OWC receiver in the updated list is selected for data acquisition. At time $t_3$, the first OWC receiver in the updated list is F2. Client data is therefore extracted from the optical signal received on OWC receiver F2.

As discussed above, checking whether the average received power on the selected OWC receiver is still above the selection threshold may be conducted on a continuous or discrete basis. In some examples, a checking interval of 1 ms may be imposed. Shorter checking intervals may be envisaged according to the processing capabilities of the UE. A 1 ms checking interval may result in a 1 ms period during which the average received power on the selected OWC receiver has dropped below the selection threshold, or even the viability threshold, before a new OWC receiver is selected, or data acquisition is switched to RF communication. However, it will be appreciated that such a delay may be acceptable for OWC, as it is envisaged that OWC, and in particular Li-Fi will not be used to offload latency critical cervices form the RF domain. Li-Fi is envisaged for the offload of download or streaming services, for which a 1 ms switching delay among OWC receivers would be acceptable.

Figure 6:
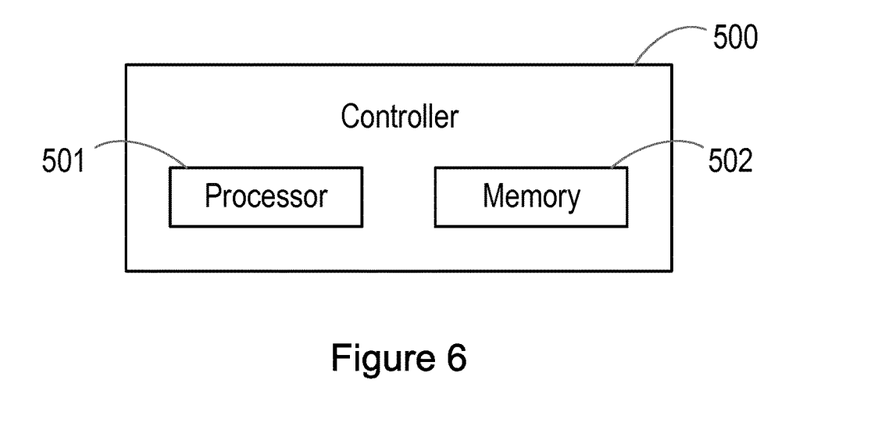
FIG. 6 is a block diagram illustrating functional units in a controller.

As discussed above, the methods 100 and 200 may be carried out by a controller which may be included within a UE. FIG. 6 illustrates an example controller 500 which may implement the methods 100, 200 for example on receipt of suitable instructions from a computer program. Referring to FIG. 6, the controller 500 comprises a processor 501 and a memory 502. The memory 502 contains instructions executable by the processor 501 such that the controller 500 is operative to conduct some or all of the steps of the methods 100 and/or 200.

Figure 7:
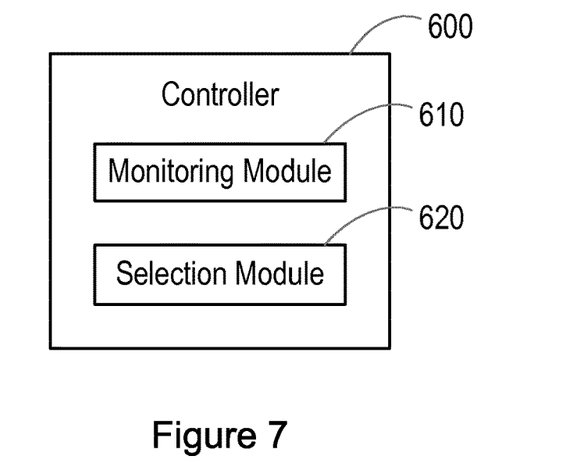
FIG. 7 is a block diagram illustrating functional units in another example of controller.

FIG. 7 illustrates an alternative example controller 600, which may implement the methods 100, 200, for example on receipt of suitable instructions from a computer program. It will be appreciated that the units illustrated in FIG. 7 may be realised in any appropriate combination of hardware and/or software. For example, the units may comprise one or more processors and one or more memories containing instructions executable by the one or more processors. The units may be integrated to any degree.

Referring to FIG. 7, the controller 600 comprises a monitoring module 610 for monitoring a captured luminous flux intensity at the OWC receivers, and a selection module 620 for, if a captured luminous flux intensity at at least one of the OWC receivers is above a viability threshold, selecting the OWC receiver having the highest captured luminous flux intensity, and extracting client data from an optical signal received on the selected OWC receiver.

If a captured luminous flux intensity at none of the OWC receivers is above a viability threshold, the selection module 620 may also be for extracting the client data from a Radio Frequency signal.

The selection module 620 may also be for selecting at least one other OWC receiver having a captured luminous flux intensity above the viability threshold, and simultaneously extracting the client data from optical signals received on the selected OWC receivers.

If the captured luminous flux intensity at the selected OWC receiver descends below a selection threshold, the selection module may be for ceasing to extract the client data from the optical signal received on the selected OWC receiver, selecting a new OWC receiver having the highest captured luminous flux intensity, and extracting the client data from an optical signal received on the new selected OWC receiver.

While the captured luminous flux intensity at the selected OWC receiver remains above the selection threshold, the selection module may continue to extract the client data from the optical signal received on the selected OWC receiver.

The selection module 620 may be for checking at discrete intervals whether or not the captured luminous flux intensity at the selected OWC receiver has descended below the selection threshold.

The monitoring module 610 may be for populating an OWC receiver list with OWC receivers having a captured luminous flux intensity above the viability threshold, and ordering the OWC receiver list according to captured luminous flux intensity. The selection module 620 may be for selecting the OWC receiver having the highest captured luminous flux intensity by selecting the first OWC receiver in the list.

The monitoring module may be for updating the populated OWC receiver list on at least one of a continuous or discrete basis.

The monitoring module 610 may be for monitoring a captured luminous flux intensity at the OWC receivers by monitoring an average received power at the OWC receivers.

Figure 8:
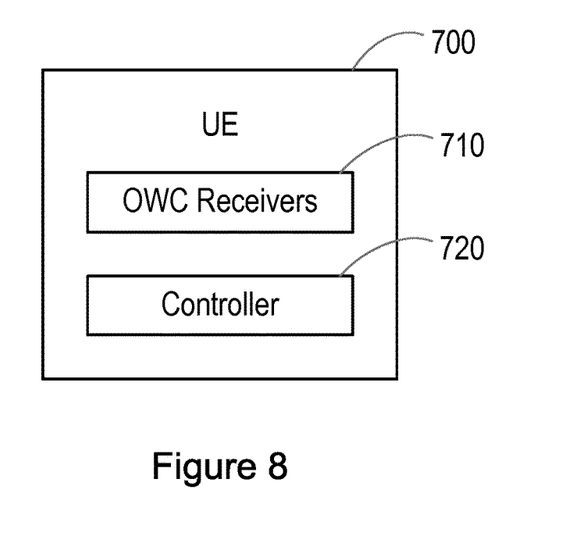
FIG. 8 is a block diagram illustrating functional units in another example of User Equipment.

The controller 500 or 600 may be incorporated into a UE as demonstrated in FIG. 8, which illustrates a UE 700 according to an aspect of the present disclosure. The UE 700 comprises at least two OWC receivers 710 and a controller 720, which may be a controller 500 or a controller 600, and may be configured to conduct some or all of the steps of the methods 100 and/or 200.

Aspects of the present disclosure thus provide a UE and a method of managing OWC in a UE that facilitate the implementation of OWC, including for example Li-Fi, in a UE configured for RF communication with a network.

A UE according to aspects of the present disclosure comprises at least two OWC receivers such as photodiodes or image sensors. The OWC receivers may in some examples be placed on opposing sides of the UE, for example the front and the back of the UE, so as to reduce the possibility that all OWC receivers will be blinded by an obstacle such as a user hand or head. In some examples, the OWC receivers comprise curved sensor components which may be located on corners of the UE, so enabling simultaneous detection of light signals from either side of the UE without impacting the aesthetics or the usability of the UE.

A method for managing OWC in a UE according to further aspects of the present disclosure enables the selection of at least one of the OWC receivers on a UE for extraction of client data. The selection may be updated as the strength of a received optical signal varies at the different OWC receivers. If no viable optical signal is received, the examples of the method envisage reverting to RF communication.

Aspects of the present disclosure thus ensure an equivalent ease of use for OWC to that already existing for RF communications. For cellular communications and Wi-Fi a user does not need to pay attention to the way in which a UE is held or oriented, as the relevant internal antennas cannot be blinded by the hand or by other obstacles near the terminal. The UE and method according to aspects of the present invention ensure that similar ease of use can be provided for OWC, despite the difference in propagation range and penetration of optical signals compared to RF signals.

Facilitating OWC enables the offloading of certain traffic such as downloads and streaming from the overcrowded RF domain, so indirectly improving the quality of the cellular and Wi-Fi network. In addition, battery life of a UE may be extended owing to the low power consumption of OWC receivers such as photodetectors. Suitable photodetectors are available at low cost if they are integrated on board throughout CMOS. For example, photodetectors based on germanium material are most compatible with high yield CMOS photonics processes for large wafer scale production (300 mm or 400 mm wafers), and the use of a plurality of these components will not have a significant impact upon the cost of a UE.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for managing Optical Wireless Communication (OWC) in a User Equipment (UE) configured for Radio Frequency (RF) communication with a network, the UE comprising at least two OWC receivers, the method comprising:
monitoring respective luminous flux intensities captured by the respective OWC receivers; and
based on determining that a luminous flux intensity captured by at least one of the OWC receivers is above a viability threshold:
selecting the OWC receiver that captured the highest luminous flux intensity, and
extracting client data from an optical signal received on the selected OWC receiver.

2. A method as claimed in claim 1, further comprising, based on determining that none of the luminous flux intensities captured by the respective OWC receivers is above the viability threshold, extracting the client data from an RF signal.

3. A method as claimed in claim 1, further comprising:
selecting at least one other OWC receiver that captured a luminous flux intensity above the viability threshold; and
simultaneously extracting the client data from optical signals received on the selected OWC receivers.

4. A method as claimed in claim 1, further comprising, based on determining that the luminous flux intensity captured by the selected OWC receiver descends below a selection threshold, performing the following operations:
ceasing to extract the client data from the optical signal received on the selected OWC receiver;
selecting a further one of the OWC receivers that captured the highest luminous flux intensity; and
extracting the client data from an optical signal received on the selected further OWC receiver.

5. A method as claimed in claim 4, wherein the selection threshold is greater than the viability threshold.

6. A method as claimed in claim 4, further comprising, based on determining that the luminous flux intensity captured by the selected OWC receiver remains above the selection threshold, continuing to extract the client data from the optical signal received via the selected OWC receiver.

7. A method as claimed in claim 4, further comprising determining at discrete intervals whether or not luminous flux intensity captured by the selected OWC receiver has descended below the selection threshold.

8. A method as claimed in claim 1, further comprising:
populating an OWC receiver list with OWC receivers that captured luminous flux intensities above the viability threshold; and
ordering the OWC receiver list according to captured luminous flux intensity,
wherein selecting the OWC receiver that captured the highest luminous flux intensity comprises selecting the first OWC receiver in the list.

9. A method as claimed in claim 8, further comprising updating the populated OWC receiver list, on at least one of a continuous or discrete basis, based on updated respective luminous flux intensities captured by the respective OWC receivers.

10. A method as claimed in claim 1, wherein:
monitoring the respective luminous flux intensities captured by the respective OWC receivers comprises monitoring respective average received powers indicated by the respective OWC receivers; and
selecting the OWC receiver that captured the highest luminous flux intensity comprises selecting the OWC receiver that indicated the highest average received power.

11. A method as claimed in claim 1, wherein at least one of the OWC receivers is operable to capture luminous flux incident from a first side of the UE, and at least one of the OWC receivers is operable to capture luminous flux incident from a second side of the UE, the second side being opposed to the first side.

12. A method as claimed in claim 1, wherein at least one of the OWC receivers is located on a corner of the UE.

13. A method as claimed in claim 12, wherein the at least one OWC receiver comprises a quarter spherical lens array.

14. A non-transitory, computer-readable medium comprising computer-executable instructions that, when executed on at least one processor of a user equipment (UE), configure the UE to perform operations corresponding to the method of claim 1.

15. A controller for managing Optical Wireless Communication (OWC) in a User Equipment (UE) configured for Radio Frequency (RF) communication with a network, the UE comprising at least two OWC receivers, the controller comprising:
- a processor; and
- a memory containing executable instructions that, when executed by the processor, configure the controller to perform operations corresponding to the method of claim 1.

16. A controller as claimed in claim 15, wherein execution of the instructions further configures the controller to, based on determining that none of the luminous flux intensities captured by the respective OWC receivers is above the viability threshold, extract the client data from an RF signal.

17. A User Equipment (UE) configured for Radio Frequency (RF) communication with a network and for Optical Wireless Communication (OWC), the UE comprising:
- at least two OWC receivers; and
- a controller as claimed in claim 15.

18. A UE as claimed in claim 17, wherein:
- at least one of the OWC receivers is arranged to capture luminous flux incident from a first side of the UE;
- at least one of the OWC receivers is operable to capture luminous flux incident from a second side of the UE; and
- the second side is opposed to the first side.

19. A UE as claimed in claim 17, wherein at least one of the OWC receivers is located on a corner of the UE.

20. A UE as claimed in claim 19, wherein the at least one OWC receiver, located on the corner, comprises a quarter spherical lens array.

21. A UE as claimed in claim 19, wherein the at least one OWC receiver, located on the corner, is constructed from at least one of graphene based liquid crystal or a polymer based lens array.

* * * * *